(12) United States Patent
Spence et al.

(10) Patent No.: US 12,542,283 B2
(45) Date of Patent: Feb. 3, 2026

(54) CARBON FIBER ELECTRODE WITH ENHANCED ACTIVE MATERIAL AND LEAD ACID BATTERY HAVING SAME

(71) Applicant: CPS Technology Holdings LLC, New York, NY (US)

(72) Inventors: Matthew A. Spence, Lindenhurst, IL (US); Paul D. Korinek, West Bend, WI (US)

(73) Assignee: CPS Technology Holdings LLC, New York, NY (US)

( * ) Notice: Subject to any disclaimer, the term of this patent is extended or adjusted under 35 U.S.C. 154(b) by 537 days.

(21) Appl. No.: 17/797,261

(22) PCT Filed: Feb. 5, 2021

(86) PCT No.: PCT/US2021/016731
§ 371 (c)(1),
(2) Date: Aug. 3, 2022

(87) PCT Pub. No.: WO2021/158859
PCT Pub. Date: Aug. 12, 2021

(65) Prior Publication Data
US 2023/0052472 A1    Feb. 16, 2023

Related U.S. Application Data

(60) Provisional application No. 63/065,070, filed on Aug. 13, 2020, provisional application No. 62/970,472, (Continued)

(51) Int. Cl.
*H01M 4/00* (2006.01)
*H01M 4/62* (2006.01)
(Continued)

(52) U.S. Cl.
CPC ........... *H01M 4/663* (2013.01); *H01M 4/625* (2013.01); *H01M 4/627* (2013.01); *H01M 4/68* (2013.01);
(Continued)

(58) Field of Classification Search
CPC .......... H01M 4/66; H01M 4/62; H01M 10/08; H01M 4/68; H01M 4/74; H01M 4/73; Y02E 10/60
See application file for complete search history.

(56) References Cited

U.S. PATENT DOCUMENTS 3,702,265 A * 11/1972 Snyder et al. .......... H01M 4/56
                                                                   429/228
3,798,070 A *  3/1974 Ruben ..................... H01M 4/14
                                                                   429/130
(Continued)

FOREIGN PATENT DOCUMENTS

CA        2785030 A1 *  6/2011  ............ H01M 10/06
CN     102217124 A      10/2011
(Continued)

OTHER PUBLICATIONS

Abrahamson et al. Improved Lead-Acid Battery Construction, Sep. 2013, See the Abstract. (Year: 2013).*
(Continued)

*Primary Examiner* — Tiffany Legette
*Assistant Examiner* — Monique M Wills
(74) *Attorney, Agent, or Firm* — Boardman & Clark LLP

(57) ABSTRACT

An lead-acid battery is described. The battery includes a carbon fiber electrode having a paste containing a novel additive including one or more carbons, organic expanders, and barium sulfate.

19 Claims, 11 Drawing Sheets

Related U.S. Application Data filed on Feb. 5, 2020, provisional application No. 62/970,504, filed on Feb. 5, 2020.

(51) Int. Cl.
  *H01M 4/66* (2006.01)
  *H01M 4/68* (2006.01)
  *H01M 4/73* (2006.01)
  *H01M 4/74* (2006.01)
  *H01M 10/08* (2006.01)
  *H01M 4/02* (2006.01)

(52) U.S. Cl.
  CPC ............. *H01M 4/73* (2013.01); *H01M 4/747* (2013.01); *H01M 10/08* (2013.01); *H01M 2004/027* (2013.01)

(56) References Cited

U.S. PATENT DOCUMENTS

| | | |
|---|---|---|
| 9,543,589 B2 | 1/2017 | Christie et al. |
| 2012/0328940 A1 | 12/2012 | Bosnyak et al. |
| 2018/0151872 A1* | 5/2018 | Zhamu .................. H01M 4/362 |
| 2020/0052286 A1* | 2/2020 | Johns .................... H01M 10/08 |

FOREIGN PATENT DOCUMENTS

| | | | |
|---|---|---|---|
| CN | 103765642 A | 4/2014 | |
| CN | 104321910 A | 1/2015 | |
| CN | 110127744 A | 8/2019 | |
| JP | S58111263 A | 7/1983 | |
| WO | 2010059729 A1 | 5/2010 | |
| WO | WO-2013133724 A2 * | 9/2013 | ............ H01M 10/06 |
| WO | 2017060837 A1 | 4/2017 | |
| WO | 2021158859 A1 | 8/2021 | |

OTHER PUBLICATIONS

Abrahamson, Lead-Acid Battery Construction, Jun. 2011, See the Abstract. (Year: 2011).*

International Search Report and Written Opinion, PCT/US2021/016731, mailed May 26, 2021, 11 pages.

* cited by examiner

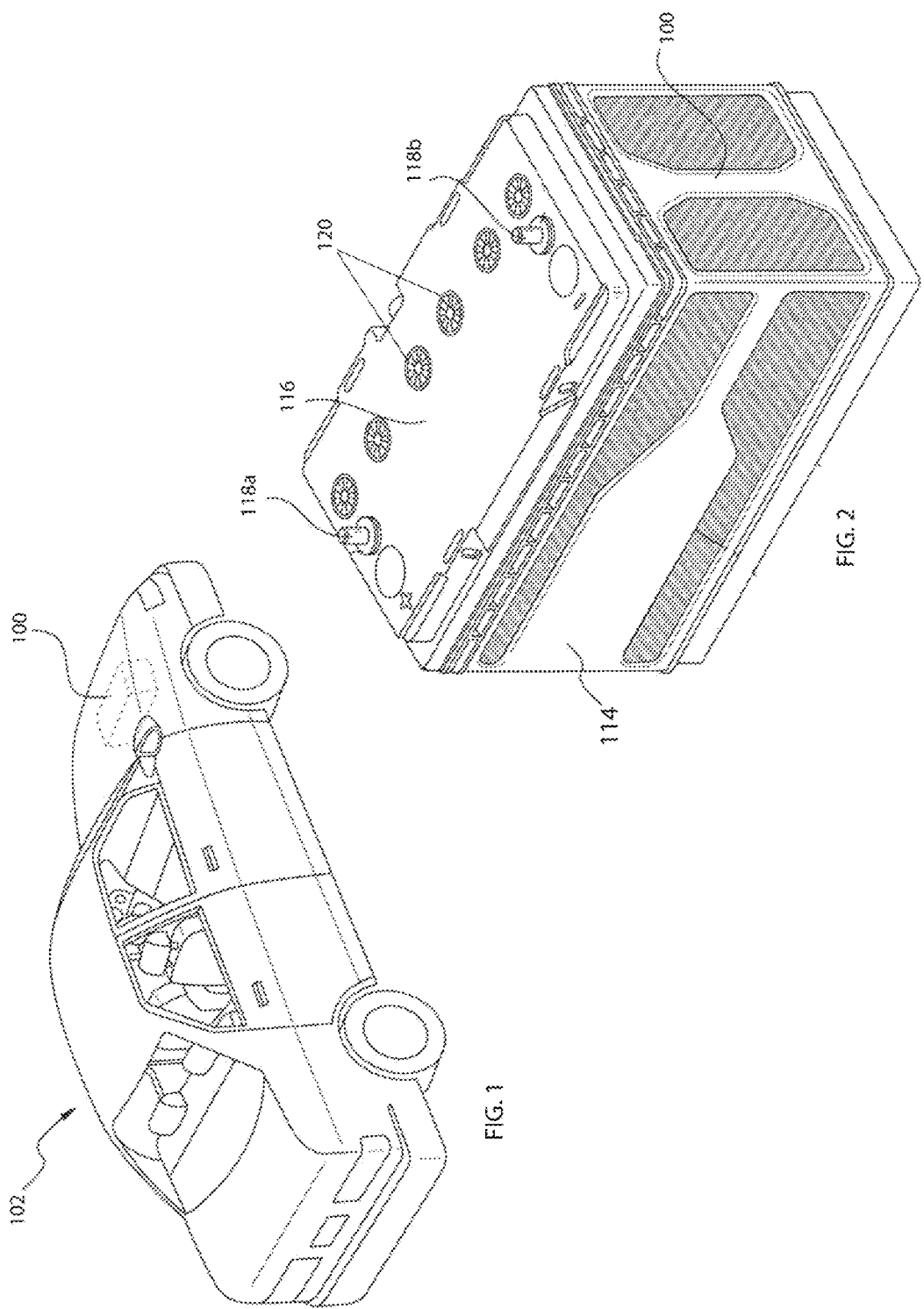

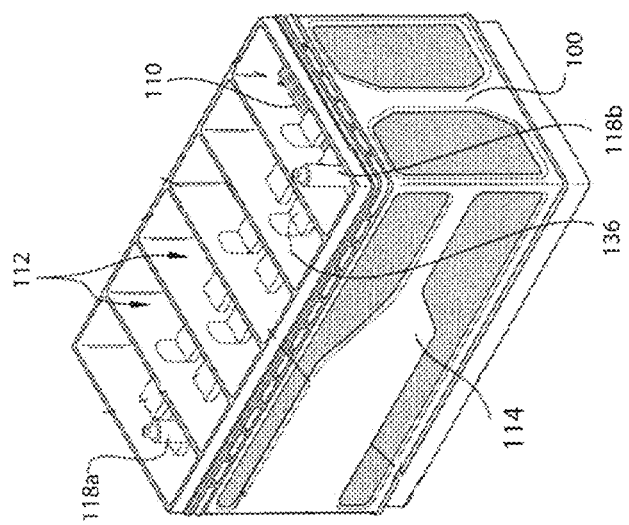

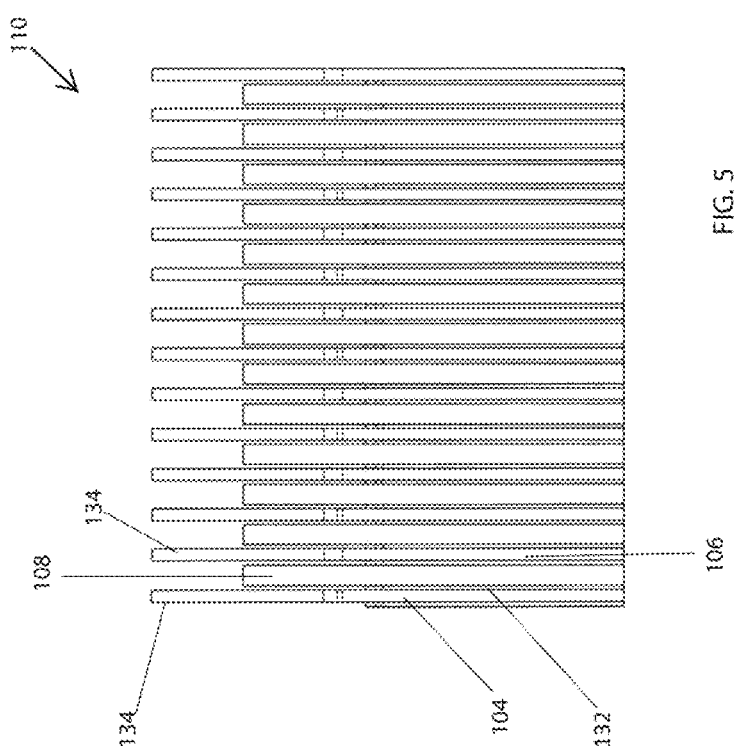

CARBON FIBER ELECTRODE WITH ENHANCED ACTIVE MATERIAL AND LEAD ACID BATTERY HAVING SAME

CROSS-REFERENCE TO RELATED APPLICATIONS

This application is a national stage application under 35 U.S.C. 371 of international application No. PCT/US2021/016731, filed Feb. 5, 2021, entitled "CARBON FIBER ELECTRODE WITH ENHANCED ACTIVE MATERIAL AND LEAD ACID BATTERY HAVING SAME." The international application No. PCT/US2021/016731 claims priority from U.S. Provisional Patent Application No. 63/065,070 filed Aug. 13, 2020, entitled "CARBON FIBER MAT WITH ULTRAFINE BARIUM SULFATE FOR ELECTRODE," the entire contents of which is hereby incorporated by reference herein in its entirety. The international application No. PCT/US2021/016731 also claims priority from U.S. Provisional Patent Application No. 62/970,504 filed Feb. 5, 2020, entitled "ENHANCED ADDITIVE NEGATIVE ACTIVE MATERIAL EMBEDDED INTO CARBON FABRIC NEGATIVE ELECTRODE," the entire contents of which is hereby incorporated by reference herein in its entirety. The international application No. PCT/US2021/016731 also claims priority from U.S. Provisional Patent Application No. 62/970,472 filed Feb. 5, 2020, entitled "CHARGE ACCEPTANCE LEAD ACID BATTERY WITH CARBON FIBER FABRIC NEGATIVE ELECTRODE AND CARBON-ENHANCED NEGATIVE PASTE," the entire contents of which is hereby incorporated by reference herein in its entirety.

FIELD

The present inventions relate to the field of batteries. The present inventions more specifically relate to the field of lead-acid batteries.

BACKGROUND

Lead-acid batteries are known. Lead-acid batteries are generally made up of plates of lead and separate plates of lead dioxide, which are submerged into an electrolyte or acid solution. The lead, lead dioxide and electrolyte provide a chemical means of storing electrical energy which can perform useful work when the terminals of a battery are connected to an external circuit. The plates of lead, lead dioxide and electrolyte, together with a battery separator, are contained within a housing of a polypropylene material.

Start-stop vehicles can place various demands on a battery. Vehicles also are increasing in the electrical load of components, for which the electrical load must be supported through a stop event. Vehicle manufacturers are seeking a cost effective, reliable energy storage solution that ensures a seamless customer experience. Therefore, there is a need for consistent reliable performance from a lead-acid battery. There is also a need for a robust battery which can support additional prolonged/intermittent loads and support optimal duration and frequency of stop events. To this end, a need exists for a lead-acid battery which provides sustainable and fast rechargeability (e.g., optimized charge acceptance) and consistent cycling performance. Accordingly, a need exists for an AGM lead-acid battery with improved performance Over existing devices.

SUMMARY

A lead-acid storage battery is disclosed which has improved performance.

More specifically, a lead-acid battery is disclosed. The lead-acid battery has a container with a cover and includes one or more compartments. One or more cell elements are provided in the one or more compartments. The one or more cell elements comprise a positive electrode, the positive electrode having a positive current collector and a positive electrochemically active material in contact with the positive current collector; a negative electrode, the negative electrode having a negative current collector and a negative active mass in contact with the negative current collector. Electrolyte is provided within the container. One or more terminal posts extend from the container or the cover and are electrically coupled to the one or more cell elements.

The positive and/or negative electrode may comprise, in lieu of a punched, cast, or expanded metal grid, for example, a cured carbon or carbonized fiber mat. The cured carbon or carbonized fiber mat may be impregnated with a paste or active material. The active material may include an expander or additive. In various non-limiting embodiments, only the negative electrode may comprise a carbon fiber mat while the positive electrode may comprise a lead grid. An improved paste having the expander or additive may be included on the negative electrode. The improved negative paste in combination with the carbonized fiber current collector may contribute to improved charge acceptance of the battery.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 1 is a perspective view of a vehicle for use with a lead-acid battery according to one or more examples of embodiments described herein.

FIG. 2 is a perspective view of the lead-acid battery that may be used in the vehicle of FIG. 1.

FIG. 3 is a perspective view of the lead-acid battery shown in FIG. 2, with the cover removed.

FIG. 5 is a partial, side elevation view of a cell element according to one or more examples of embodiments for use with the lead-acid battery shown in FIGS. 2-4.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a battery 100 is disclosed, and in particular a rechargeable battery, such as, for example, a lead-acid battery. Various embodiments of lead-acid storage batteries may be either sealed (e.g., maintenance-free) or unsealed (e.g., wet). While specific examples are described and illustrated, the battery 100 may be any secondary battery suitable for the purposes provided.

Figure 4:
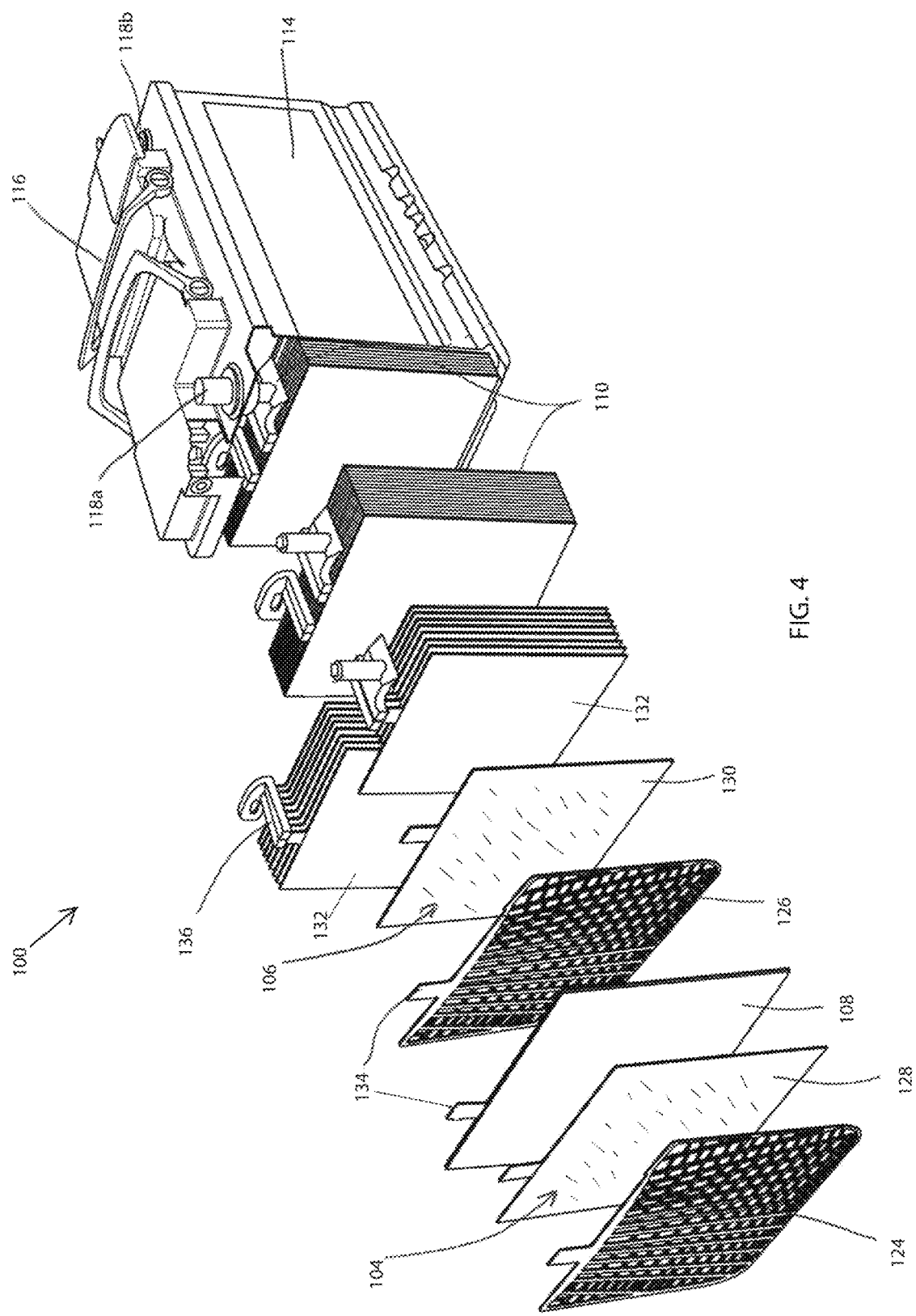
FIG. 4 is an exploded perspective view of the lead-acid battery shown in FIG. 2 and described herein.

One example of a battery 100 is provided and shown in a vehicle 102 in FIG. 1. While a vehicle battery is shown and described, the disclosure and system described herein are not limited thereto. The battery 100 may be any type of lead-acid battery, including for example, industrial or back-up batteries, as well as other types of lead-acid batteries. Referring to FIGS. 2-4, the battery 100 is a lead-acid battery. The lead-acid battery 100 is composed of a housing or container which includes a cover 116. The cover 116 is provided for the container or housing 114 and may be sealed to the container 114. In various embodiments, the container 114 and/or cover 116 includes battery terminals 118 *a, b*. As shown in FIG. 2, the battery cover 116 may also include one or more filler hole caps and/or vent assemblies 120. The housing 114 and cover 116 may be primarily composed of a polymer material. In one or more examples of embodiments, the polymer material may be a recycled polymer material. An electrolyte, which typically comprises sulfuric acid, may be included in the battery 100 within the housing 114.

Within the container 114 are positive and negative electrodes or plates 104, 106. Referring to FIG. 4, the electrodes 104, 106 include electrically-conductive positive or negative current collectors or substrates or grids 124, 126 or current collector 1001 as discussed in further detail herein. To this end, a "grid" or "current collector" may include any type of mechanical or physical support or substrate for the active material. Positive paste or electrochemically active material 128 is provided in contact with and/or on the positive grid 124 and negative paste or electrochemically active material 130 is provided on the negative grid 126. A separator 108 is positioned between the positive and negative electrodes or plates 104, 106. In a retained electrolyte-type battery 100, the separator 108 may be a porous and absorbent glass mat (AGM). In one or more examples of embodiments, the lead-acid battery herein is an AGM lead-acid battery.

As shown in FIGS. 3-4, a plurality of positive electrodes or plates 104 and a plurality of negative electrodes or plates 106 (with separators 108) generally make up at least a portion of the electrochemical cell 110. Referring to FIGS. 3-4, a plurality of plate or electrode sets or books or cell elements 110 may be electrically connected (e.g., electrically coupled in series or other configuration) according to the capacity of the lead-acid storage battery 100.

The plurality of positive electrodes or plates 104 and negative electrodes or plates 106 may be provided in stacks or sets or cell elements 110 for producing a battery 100 having a predetermined voltage, as one example, a 12-volt battery, in the vehicle 102. The number of cell elements 110 or groups or sets may be varied. It will also be obvious to those skilled in the art after reading this specification that the size and number of electrodes 104 and/or 106 in any particular group (including the size and number of the individual current collectors). The number of groups used to construct the battery 100 may vary depending upon the desired end use.

In an AGM lead-acid battery 100 which includes several cell elements 110 provided in one or more separate compartments 112 of a container or housing 114, the element stack 110 may be compressed during insertion reducing the thickness of the separator 108.

As shown in FIG. 4, each current collector has a lug 134. In FIGS. 3-4, one or more cast-on straps or intercell connectors 136 are provided which electrically couple the lugs 134 of like polarity in an electrode or plate set or cell element 110 and to connect other respective sets or cell elements 110 in the battery 100. The connection of the elements may be a single element, parallel connection (capacity doubled, voltage the same) or series connection (e.g., voltages are additive (i.e., 4V, 6V, etc.) with the same capacity). One or more positive terminal posts 118*a* and one or more negative terminal posts 118*b*, as shown in FIGS. 2-4, may also be provided, electrically coupled to the cell elements 110. Such terminal posts typically include portions which may extend through the cover and/or container wall, depending upon the battery design. It will be recognized that a variety of terminal arrangements are possible, including top, side, front or corner configurations known in the art. The intercell connectors 136 and/or terminals 118*a, b* may be composed of lead or lead alloy. In one or more examples the lead may be a recycled lead.

As described and referring to FIGS. 4-8, the electrodes 104, 106 include electrically conductive positive or negative current collectors or substrates or grids 124, 126. In one or more examples of embodiments, the positive grid or current collector or substrate 124 and/or the negative grid or current collector or substrate 126 may be composed of lead or lead alloy, which in some examples of embodiments may be or include a recycled lead.

Figure 9:
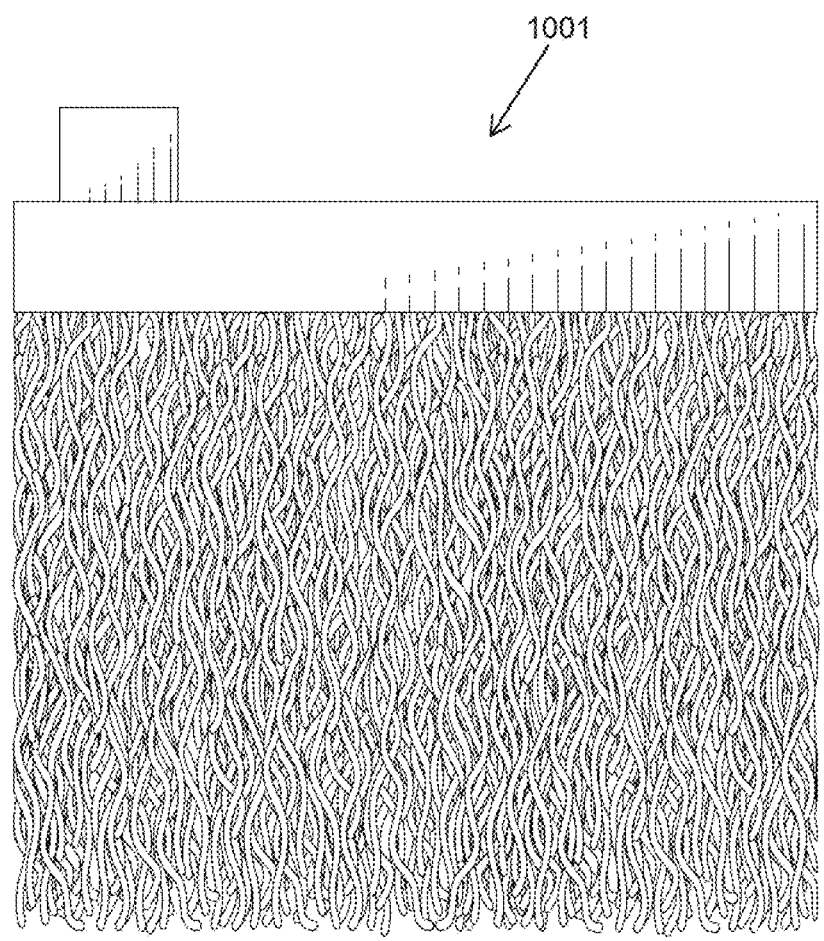
FIG. 9 is a current collector or substrate for use with the lead-acid battery shown in FIGS. 2-4 and described herein, showing example fibers in exaggerated dimensions for purposes of illustration.
Figure 10:
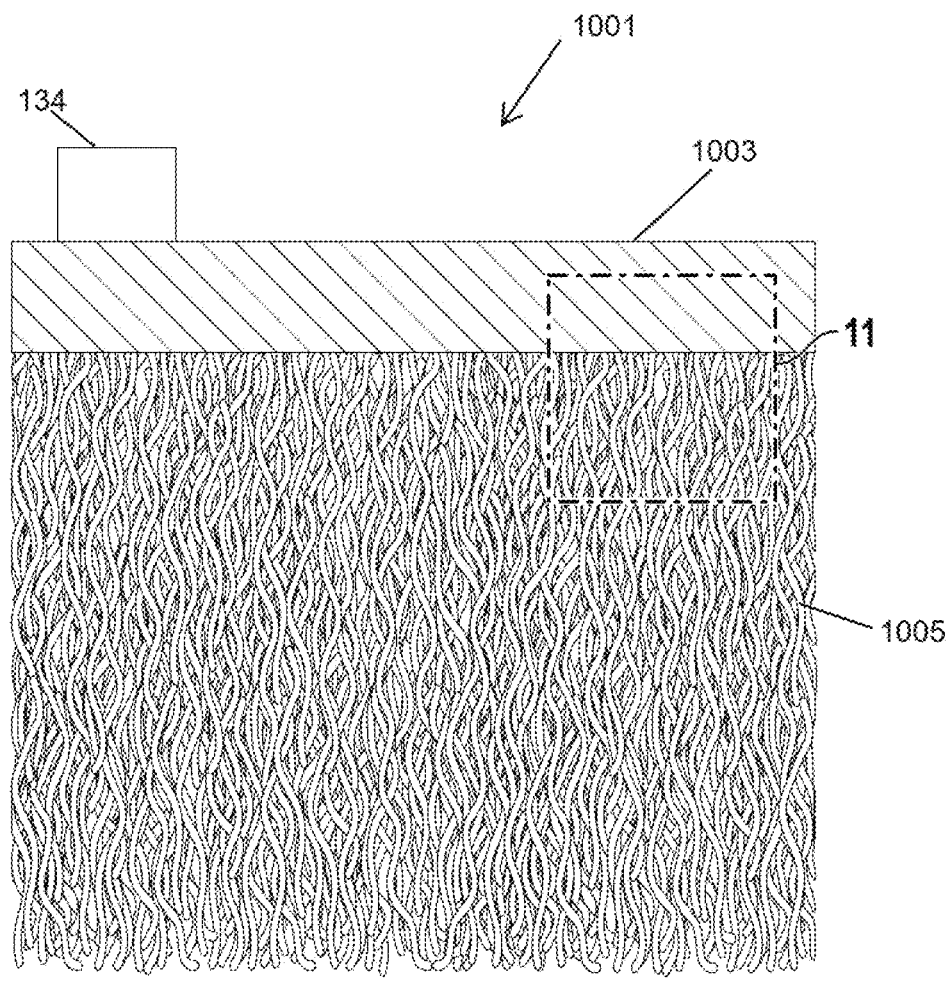
FIG. 10 is another view of a current collector or of FIG. 9 for use with the lead-acid battery.
Figure 11:
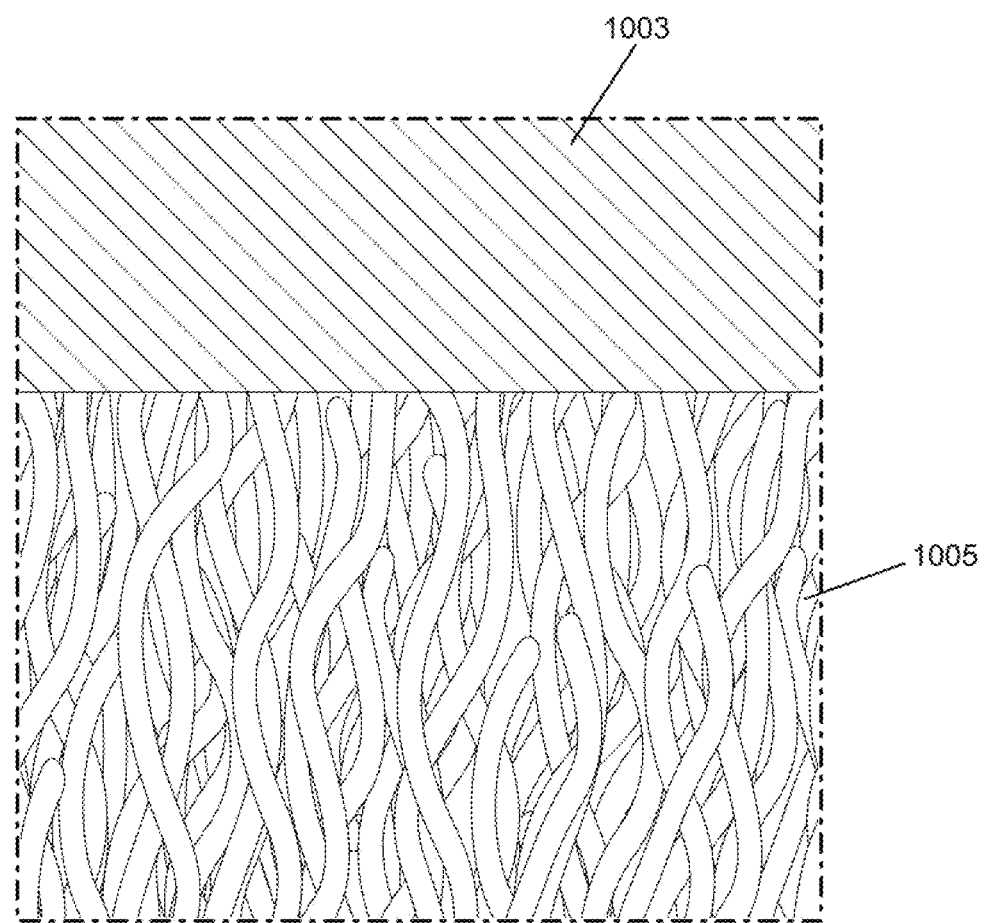
FIG. 11 is a sectional view of the current collector or substrate of FIG. 10, taken from section 11 of FIG. 10.
Figure 12:
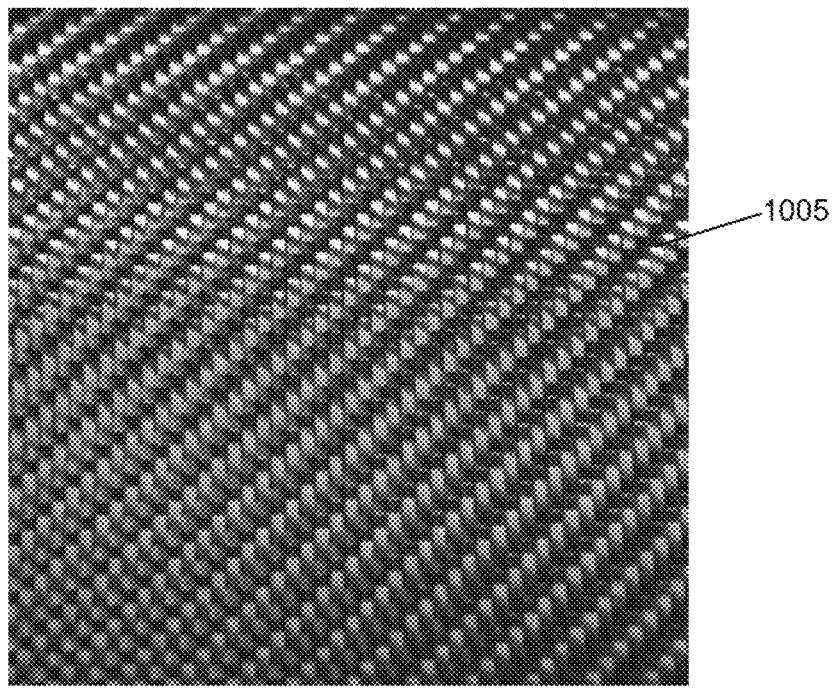
FIG. 12 is a close up cut away image of an example carbon fiber fabric which may be used with the current collector or substrate of FIGS. 9-11.
Figure 13:
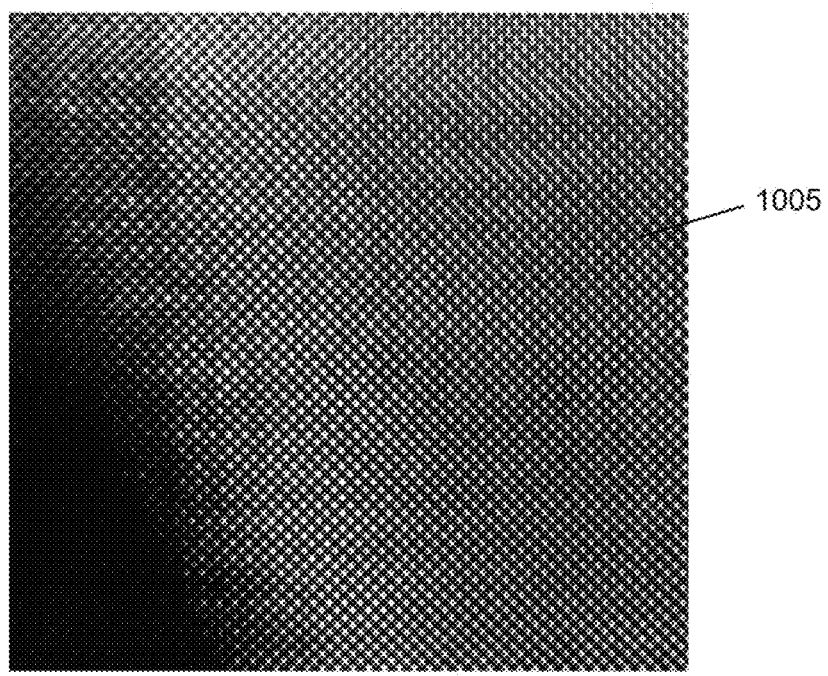
FIG. 13 is a close up cut away image of an alternative example carbon fiber fabric which may be used with the current collector or substrate of FIGS. 9-11.
Figure 14:
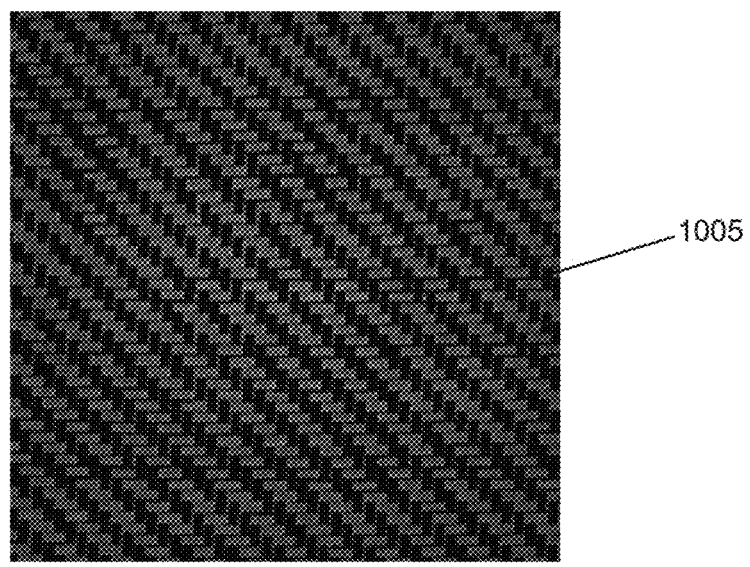
FIG. 14 is a close up cut away image of an alternative example carbon fiber fabric which may be used with the current collector or substrate of FIGS. 9-11.

However, as indicated a "grid" as used herein may include any type of mechanical support for the active material. For instance, according to one or more preferred examples of embodiments described herein at least one of the positive grid or the negative grid may comprise a fibrous material, such as a fiber mat 1005. According to one or more preferred examples of embodiments, the current collector is a conductive fibrous material forming a conductive fibrous matrix 1005. More specifically, the conductive fibrous material or conductive fibrous matrix 1005 may be a mat made of carbon or carbonized fibers. The fibers may be textile fiber material. For example, in various embodiments, the current collector may be understood to be formed from a felt-like fabric material. Accordingly, one of skill in the art will appreciate that a carbonized fiber mat 1005 may have an appearance similar to the fiber mats shown in FIGS. 12-14, and the fibers may be woven or non-woven (see FIGS. 9-12). In FIGS. 9-10 (and FIG. 16), the carbonized fibers of the mat or matrix 1005 are shown in exaggerated dimensions to illustrate the fibers and/or voids which may be present within the fiber fabric (discussed in further detail herein below). The conductive fibrous matrix provides a void volume formed by voids within the fiber matrix, between the fibers. These voids may be filled by active material or paste, and/or electrolyte. The voids and fibers also provide enhanced surface area to the current collector. In one or more examples of embodiments, the conductive fiber mat 1005 may have undergone a curing step to convert the fiber mat into a stiff current collector or substrate. The conductive fibrous material may also be present in multiple layers or a single layer.

The current collector or substrate 1001 may have a strap or frame member 1003 coupled to the mat portion 1005. The strap 1003 is bonded to the top border of the fiber mat 1005. The lead alloy strap may be connected to the fiber mat or substrate by penetration into and/or between the fibers of the fibrous material. The strap 1003 extends along the edge of the current collector 1005, and preferably along the entire length of the edge of the current collector. This strap may be understood to be electrically in communication with the mat portion 1005. Accordingly, in reference to FIGS. 9-11, the current collector or substrate 1001 comprises a mat of conductive fibers 1005, e.g., carbonized fibers, affixed to a strap 1003 having a lug 134. In this regard, the lead alloy strap 1003 has a lug 134 on a top portion thereof for electrical connection within the battery 100.

The strap 1003 having a lug 134 may be formed of metal such as lead. In various embodiments, the strap or frame member 1003 may be comprised of a metal or lead alloy. Specifically, in various embodiments, the alloy may be a calcium alloy or calcium tin alloy. In various embodiments, the strap or frame member 1003 may comprise a lead-calcium alloy. In other examples of embodiments, the frame member 1003 may be a lead-calcium-tin alloy. While a lead-calcium alloy and lead-tin-calcium alloy are described, various alloys should be understood as within the scope of this disclosure. In some examples of embodiments, the lead alloy may include one or more of aluminum, tin, silver, antimony, and/or calcium. Likewise, the alloy may also include one or more impurities.

Figure 7:
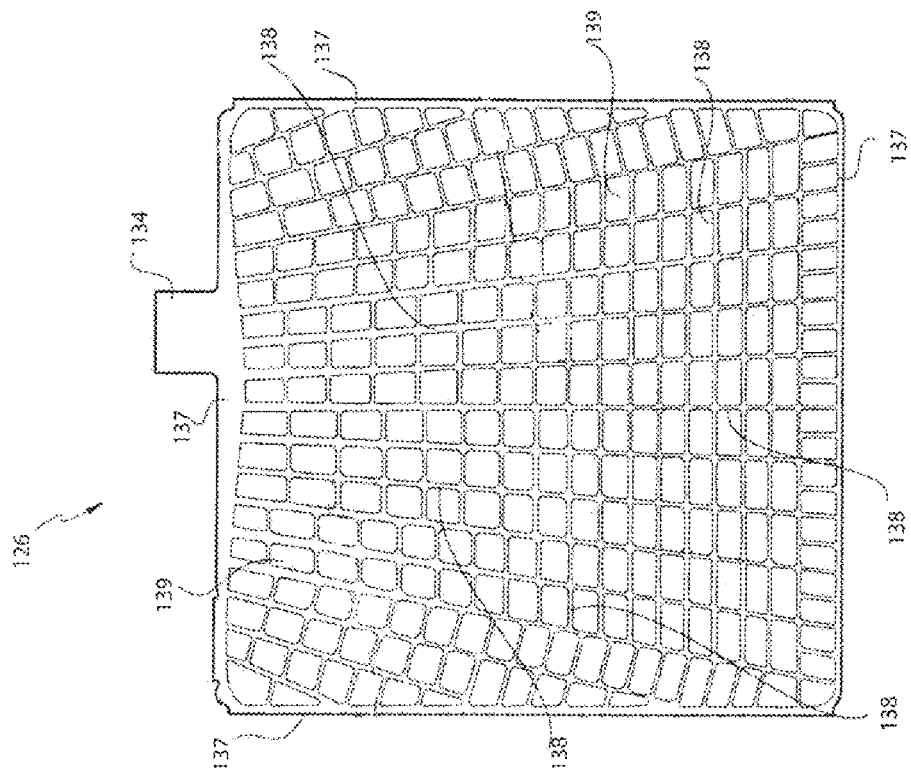
FIG. 7 is an additional elevation view of an example battery grid or substrate or current collector for use with the lead-acid battery shown in FIGS. 2-4.
Figure 6:
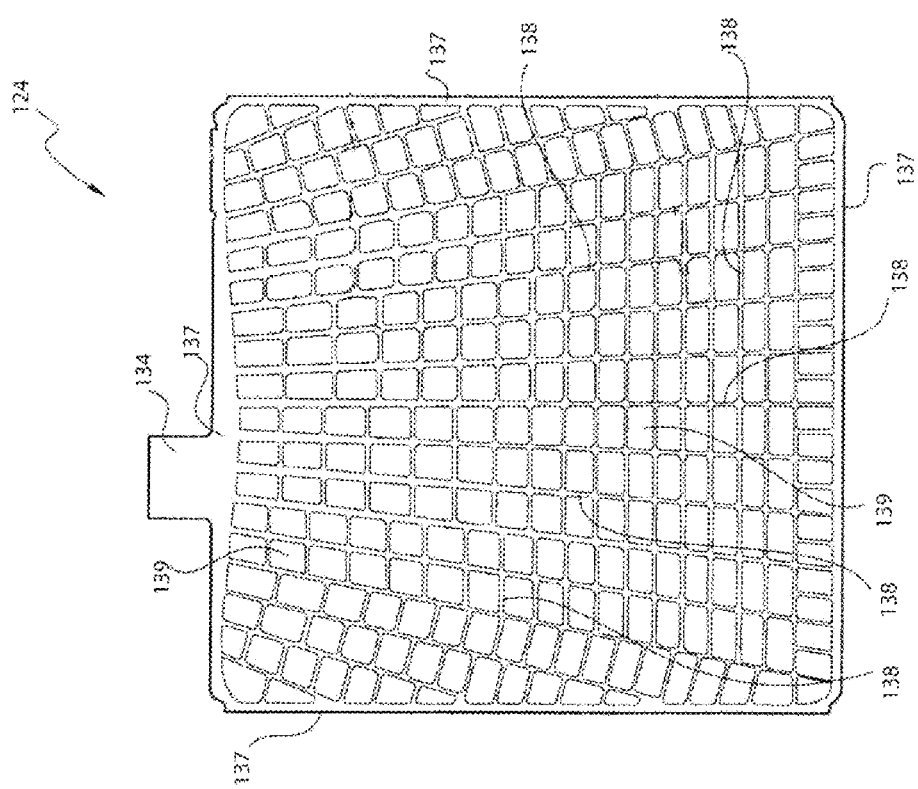
FIG. 6 is an elevation view of an example battery grid or substrate or current collector for use with the lead-acid battery shown in FIGS. 2-4.
Figure 8:
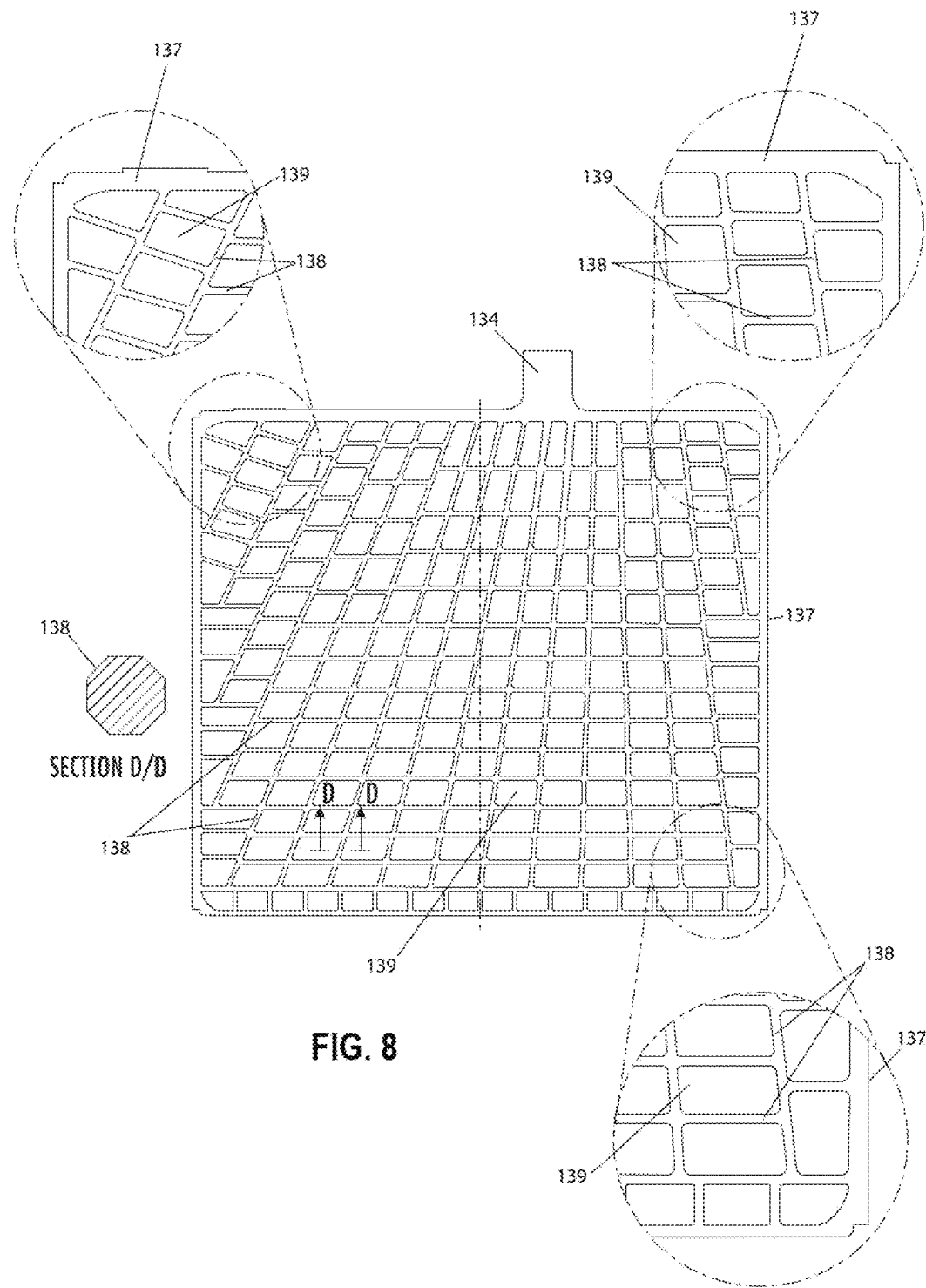
FIG. 8 is an elevation view of an alternative example battery grid or substrate or current collector for use with the lead-acid battery shown in FIGS. 2-4, showing section details of the illustrated grid.

Referring to FIGS. 6-8, the substrates or grids or current collectors 124, 126, 1001 may be composed of the same or similar material. It is contemplated, however, that material composition may also vary between the positive and the negative electrodes 104, 106 or current collectors. To this end, one or both of the current collectors (i.e., positive, negative, or both) may be stamped or punched fully framed grids 124, 126 having a frame 137 and a radial arrangement of grid wires 138 forming a pattern of open spaces 139 (various examples of grids 124, 126 suitable for use with the inventions described herein are shown and described in U.S. Pat. Nos. 5,582,936; 5,989,749; 6,203,948; 6,274,274; 6,953,641, 8,709,664, and 9,130,232 which are hereby incorporated by reference herein.) In various embodiments, one or both current collectors (i.e., positive, negative, or both) may comprise a conductive fiber mate (e.g., current collector 1001). In some embodiments, only the positive electrode 104 may comprise a conductive fiber mate current collector 1001. In other examples of embodiments, only the negative electrode 106 may comprise a conductive fiber mat current collector 1001. Accordingly, in various examples of embodiments, the grid or substrate of the positive electrode 104 or negative electrode 106 may be a punched grid, a continuously cast (concast) grid, an expanded metal grid, a carbon or carbonized felt or fiber substrate, ceramic, and so forth. In some examples of embodiments, the grid or current collector may also include surface roughening or may be subjected to one or more different surface treatments (e.g., solvent, surfactant and/or steam cleaning), such as may be used to improve paste adhesion among other benefits.

In one example of embodiments, the positive and negative grids 124, 126 are formed of different thicknesses. However, it is contemplated that the grids 124, 126 may be of the same thickness. The thickness of each grid 124, 126 may be varied based upon desired manufacturing and performance parameters. For instance, thickness may be determined based upon manufacturing requirements, such as minimum requirements for paste adhesion, improved cycle performance, endurance, or other suitable parameters. While specific examples are provided for purposes of illustration, variations thereon may be made to provide grid dimensions suitable for the particular application. Likewise, while specific examples of current collector, grid, and substrate arrangements and grid or substrate types are described for purposes of example, one of skill in the art will appreciate that any grid structure or arrangement suitable for the purposes of the battery 100 may be substituted in place of the described grids/current collectors 124, 126, 1001.

As described in various embodiments herein, the positive and negative electrodes or plates 104, 106 are paste-type electrodes (FIG. 4). Thus, each plate 104, 106 comprises a current collector or grid 124, 126, 1001 pasted with electrochemically active material 128, 130. More specifically, the paste-type electrode includes a current collector or grid which acts as a substrate and an electrochemically active material or paste is provided in contact with and/or on the substrate. The current collectors or grids 124, 126, 1001, including a positive grid and a negative grid, provide an electrical contact between the positive and negative electrochemically active materials or paste 128, 130 which may serve to conduct current. More specifically, positive paste 128 is provided in contact with and/or on the positive grid 124 and negative paste 130 is provided in contact with and/or on the negative grid 126. That is, the positive plate 104 includes a positive grid 124 having or supporting a positive electrochemically active material or paste 128 thereon, and in some examples of embodiments may include a pasting paper or a woven or non-woven sheet material comprised of fibers (e.g., a "scrim") 132; and the negative plate 106 includes a negative grid 126 having or supporting a negative electrochemically active material or paste 130 thereon, and in some examples of embodiments may include a pasting paper or scrim 132. The scrim, in one or more examples of embodiments may be composed of or include glass fibers. In other examples, the scrim may include other fiber materials, such as but not limited to polymer.

As described and shown in FIG. 10, the current collector 1001 may comprise a fiber mat portion 1005 which may comprise, for example, a plurality of carbonized fibers. In this example, the current collector may be provided with a paste and cured, forming an electrode. That is, the current collector 1001 may therefore be understood to be impregnated with a paste and have undergone a curing step (either before or after impregnation with a paste) to produce a stiff grid.

The electrochemically active material or paste (positive and negative) may be formed of compositions including lead or leady oxide. In one or more examples, the lead may be a recycled lead. As is known, the paste or electrochemically active material (positive or negative) is oftentimes a mixture of lead and lead oxide or lead dioxide particles and dilute sulfuric acid, and may include other additives, such as carbon, barium sulfate, and/or expander such as lignosulfonate. In one preferred example of embodiments, the negative electrochemically active material may include the other additives described above. Additives may be provided in varying amounts and combinations to the paste (positive and/or negative) suitable for the intended purposes of the battery. Alternative negative mass/paste recipes may also be provided which accomplish the objectives described herein. For example, the negative active material or paste 130 may also contain fiber and/or "expander" additives which may help maintain the active material structure and improve performance characteristics, among other things.

In various embodiments, a negative active material is provided on the negative electrode 106. For example, the active material is a negative paste (e.g., the negative paste 130, described above). The active material or paste 130 may be provided on the negative electrode 106, particularly on mat portion 1005. In various embodiments, the paste 130 (negative paste) further comprises carbon or a carbon additive. In various embodiments, the negative paste comprises carbon fibers or other known carbon sources. In other words, both the mat portion 1005 and negative paste 130 may comprise carbon.

In various embodiments, the negative paste 130 comprises high surface area fibers. In various embodiments, the negative paste 130 comprises chopped carbon fibers. The negative paste may comprise organic expanders (e.g., lignins, humic acid), advanced carbon additives, or both advanced carbon additives and organic expanders.

More specifically, according to one or more examples of embodiments, the active material or paste 128 and/or 130 may have an improved composition or recipe over traditional batteries. Preferably, the active material composition or recipe provides a changed, or improved, charge acceptance performance and/or efficiency (e.g., dynamic charge acceptance, i.e., relatively short duration charge pulse) over existing AGM batteries while also maintaining or improving CCA (Cold Cranking Amps) performance and cycle life performance.

For example the negative mass recipe may include an improved expander, or other additives which accomplish the foregoing objectives. In various examples, the negative mass may include one or more additives. In this regard, improved AGM battery charge acceptance of the negative plate 106 may be accomplished by using individually or in combination (e.g., as an addition to the negative paste 130 or included in the negative paste mass) one or more of the following additives which are combined with one or more of the paste mixture materials described herein:

One or more carbons (carbonaceous materials) or conductive carbons, such as but not limited to, high surface area conductive carbon black with specific properties for the intended purposes—such as for example carbon black having surface areas above those found for standard carbon blacks, i.e. >100 m2/g specific surface area, more specifically greater than 120 m2/g—, and/or natural or synthetic graphite, and/or carbon nanotubes, and/or graphene, and/or activated carbon, and the like; carbons may also include or be types of materials that are surface treated to produce an oxidized surface, treated/purified to remove tramp metals, or thermally treated to promote differing degrees of graphitization; the one or more carbon(s) being provided at dosing levels from approximately 0.01 to 1.0 weight percent (wt %), and more preferably at dosing levels ranging from approximately 0.09 to 0.9 wt %; for example: dosing levels for some components, e.g., carbon nanotubes, are very low and may be from approximately 0.01 to 0.1 wt %, while activated carbons and graphites may approach approximately 1.0 wt % dosage level;

One or more organic expanders, such as but not limited to, dispersant-type materials, including for example, synthetic organic materials (e.g., molecules of the type: polycondensate of aromatic sulfones, including phenyl sulfone, naphthalene sulfone, benzyl sulfone, etc.; polycondensates of aromatic disulfones, aromatic hydroxy-sulphones, aromatic dihydroxy-disulfones, etc.; and/or sodium salts of same, as well as naphthalene sulfonate condensate, phenolic sulfonate condensate molecules, and/or combinations thereof) and/or non-synthetic organic materials derived from, for example wood chemicals (e.g., lignin, lignosulfonates, inmates or humic acid (and ionic salts thereof, i.e., sodium lignosulfonate) and/or combinations thereof), among others at dosing levels from approximately 0.01 to approximately 1.0 wt %, and more preferably may be from approximately 0.1 to approximately 0.5 wt %; and/or Barium sulfate, which may be very fine particle size barium sulfate, namely, from less than 0.1 micron (um, μm) to approximately 1 micron at a wt % dosing level ranging from approximately 0.5 to 2.0 wt %, more preferably 0.5 to 1.5 wt %, and in some examples more preferably may range from approximately 0.7 to 1.25 wt %, and even more preferably may range from approximately 0.90 to 1.10 wt %. In some examples of embodiments, the fine particle barium sulfate is less than 0.1 micrometers mean particle size.

The respective percentages described are weight percent (wt %) relative to the dry leady oxide used in the paste mix, e.g., before pasting.

Additives may be provided in varying amounts and combinations suitable for the intended purposes of the battery. In one or more preferred examples of embodiments, a plurality of conductive carbons may be used in the negative electrochemically active material. For example, the paste mixture may comprise a first conductive carbon and a second conductive carbon, in addition to one or more of the additional components described herein. Alternative negative mass recipes may also be provided which accomplish the objectives described herein. It is also contemplated that other materials or compositions may be present in the paste mix, such as for example, water, fibers (e.g., polymer or glass), sulfuric acid, and so forth.

Referring to the foregoing, carbon nanotubes and the like may maintain a conductive matrix in the active material, thereby improving performance, especially in regards to micro-cycling as used in micro-hybrid and start-stop applications. In other examples, surface oxidized graphite, as well as conductive carbon black with high surface area and high structure also provide improved performance. According to further examples of embodiments, one or more carbons may be combined (by weight percent) such as a conductive large particle carbon and a smaller particle carbon form (e.g., allotrope).

In one or more additional examples of embodiments, the formulation of the negative paste 130 may comprise an ultra-fine barium sulfate as part of the active material paste or slurry for inclusion on the negative plate 106 (e.g., a carbon fiber mat, a plate with a carbon felt grid). The barium sulfate may be ultra-fine, which may comprise a particle size less than 1 micrometer, more specifically no more than 0.8 micrometers, or a range from 0.4 to 0.04 micrometers.

Advantageously, fine particle barium sulfate produces a greater number of small lead sulfate crystals during discharge. These small lead sulfate crystals are easier to dissolve during a charge than large lead sulfate crystals, leading to an improvement in charge acceptance.

In alternative or supplemental embodiments, the addition of barium hydroxide (barium carbonate) to the lead battery paste and its reaction with sulfuric acid may produce small barium particles in situ. The described negative paste 130 has various advantages, including but not limited to, helping with static charge acceptance performance and recovery from a fully discharged condition.

In addition to the foregoing, the negative plate 106 may also have the advantageous feature of resisting the buildup of dense passivating lead sulfate. For example, for the negative plate 106, the charge/discharge reaction involves the conversion of lead to lead sulfate (discharge) and the lead sulfate to lead (recharge). The process proceeds via a dissolution-precipitation mechanism. Components that influence either dissolution or precipitation can influence performance. For instance: (1) fine particle barium sulfate is believed to provide more nucleation sites for fine lead sulfate deposition and dissolution; (2) organic expanders are surface active molecules which impede the deposition of lead as a non-porous layer, the lead is deposited as high surface area sponge lead in the presence of organic expanders, i.e., organics prevent sintering of the lead electrode; (3) the carbon conductive network allows better utilization of the inner part of the active material, so reactions are not limited to the surface of the plate where mass transport is easiest, the foregoing assists in mitigation the lead-sulfate buildup on the surface of plates which prevents access to the interior of the active mass; (4) the carbon may impart an increase in capacitance enabling the battery to absorb high power charge pulses.

The negative plate 106 may also have the advantageous feature of, in one or more examples, maintaining functionality for the life of the battery 100. For instance, the negative plate 106 may have low gassing and low water consumption, enabling, for example, longer useful service life in a vehicle 102 during idle-stop-start operation. As a non limiting example, the surface active properties of the components (e.g., barium sulfate, organic expander, and carbon additive) may change the electrochemical potential of the active material surface, thereby, changing the rate of fundamental reactions such as gas evolution. The additives may act to change the electrochemistry, changing the rate or potential at which gas is produced. Lead acid batteries produce gas on charging—hydrogen from the negative and oxygen from the positive—the rate of gas production (and water loss) can be modified by the paste additives. Components with a high surface area can lower the current density, while carbons may have a capacitive effect, and organic materials may bind to surfaces preventing access to the surface and thus raise the potential at which gas is evolved.

Additives may be provided in varying amounts and combinations suitable for the intended purposes of the battery. Alternative negative mass recipes may also be provided which accomplish the objectives described herein. It is also contemplated that other materials or compositions may be present in the paste mix, such as for example, water, fibers (e.g., polymer or glass), sulfuric acid, and so forth.

As indicated, separator material 108 may be provided between each positive electrode or plate 104 and negative electrode or plate 106. The separator 108 may be a porous and absorbent glass mat (ACM). To this end, an AGM lead-acid battery has positive and negative electrodes or plates 104, 106 which are separated by an absorbent glass mat 108 that absorbs and holds the battery's acid or electrolyte and prevents it from flowing freely inside the battery 100. The working electrolyte saturation is at some value below 100% saturation to allow recombinant reactions of hydrogen and oxygen. In some examples, the absorbent glass mat 108 may also be used with an additional separator (not shown); various common commercially available separators are known in the art. The separator may be a "U-shape" wrapping the plate or electrode, but the separator or AGM can be a single sheet or, for example, can be a single length concertina with plates separated by 2 layers. Accordingly, in various embodiments, the electrode including the current collector, e.g., current collector 1001, may further be wrapped in or interleaved with a separator. A single or double layer of separator 108 may be employed. For example, a separator may be provided on the positive plate 104 and an AGM 108 may also be employed with the positive/negative plates 104, 106.

An electrolyte, which is typically sulfuric acid, may be included in the battery 100. In various examples, the electrolyte may include one or more metal ions. To this end, the sulfuric acid electrolyte may be a sulfuric acid solution including one or more metal sulfates.

As an alternative embodiment, a carbon fabric as disclosed herein may be chopped and integrated into the negative paste 130. The paste 130 comprising the chopped carbon fabric may then be applied to a conventional grid 126, for example those disclosed in FIGS. 6-7 and described further herein.

The disclosed may have various advantages to battery performance, including but not limited to, increased charge acceptance. Improved charge acceptance in lead acid batteries facilitates fuel efficiency improvements that may reduce $CO_2$ emissions and facilitate advanced vehicle features such as start/stop.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only, and not limiting. Although only a few embodiments have been described in detail in this disclosure, those skilled in the art who review this disclosure will readily appreciate that many various alternatives, modifications, variations, improvements and/or substantial equivalents, whether known or that are or may be presently foreseen, are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

We claim:

1. An electrode comprising a carbonized fiber current collector having a paste with an additive that improves charge acceptance, with the additive having components, the components consisting of:
   an organic expander;
   barium hydroxide; and
   ultrafine barium sulfate, with the ultrafine barium sulfate having a particle size range from 0.04 micrometers to 0.8 micrometers and having an amount of nucleation sites greater than a second amount of nucleation sites for a barium sulfate having a particle size range greater than 1 micrometer for a charge acceptance greater than the barium sulfate having the particle size range greater than 1 micrometer.

2. The electrode of claim 1, wherein the additive includes carbon.

3. The electrode of claim 1, wherein the carbonized fiber current collector comprises a woven carbon fiber mat.

4. The electrode of claim 1, wherein the carbonized fiber current collector comprises a felted carbon fiber mat.

5. The electrode of claim 1, wherein the carbonized fiber current collector is a negative carbonized fiber current collector.

6. A lead-acid battery with an electrode defined in claim 1, wherein the additive comprises carbons, organic expanders, and barium sulfate.

7. The lead-acid battery of claim 6, wherein the additive includes barium hydroxide.

8. The lead-acid battery of claim 6, wherein an electrolyte in the battery includes sulfuric acid, and wherein a reaction between the barium hydroxide and sulfuric acid produce barium particles in situ.

9. The lead-acid battery of claim 6, wherein the carbonized fiber current collector comprises a woven carbon fiber mat.

10. The lead-acid battery of claim 6, wherein the carbonized fiber current collector comprises a felted carbon fiber mat.

11. The lead-acid battery of claim 6, wherein the carbonized fiber current collector is a negative carbonized fiber current collector.

12. The lead-acid battery of claim 6, the carbonized fiber current collector further includes a negative paste.

13. A lead-acid battery, comprising:
    a carbon fiber current collector having an electrochemically active material and a fiber mat portion, the electrochemically active material having one or more additives, with at least one of the one or more additives having components, the components consisting of:
    an organic expander
    barium hydroxide; and
    ultrafine barium sulfate, with the ultrafine barium sulfate having a particle size range from 0.1 microns to 0.8 microns and having an amount of nucleation sites greater than an second amount of nucleation sites for a barium sulfate particle having a particle size range greater than 1 micron for a charge acceptance greater than the barium sulfate particle having a particle size range greater than 1 micron; and
    the fiber mat portion having a plurality of carbonized fibers.

14. The lead-acid battery of claim 13, the fiber mat is a woven carbon fiber mat.

15. The lead-acid battery of claim 13, the fiber mat is a felted carbon fiber mat.

16. The lead-acid battery of claim 13, the carbon fiber current collector further includes a negative electrochemically active material.

17. The lead-acid battery of claim 16, wherein the active material includes barium hydroxide.

18. The lead-acid battery of claim 13, wherein the carbon fiber current collector is a negative carbon fiber current collector.

19. The lead-acid battery of claim 16, wherein the carbon fiber current collector comprises a carbon, an organic expander, and barium sulfate.

* * * * *